United States Patent [19]
Rawlings et al.

[11] 3,875,310
[45] Apr. 1, 1975

[54] RUMINANT FEED SUPPLEMENT COMPRISING AN AMMONIATED PROTEIN-ALDEHYDE COMPLEX

[76] Inventors: Robert M. Rawlings, 901 Imperial Plaza, 200 N. 3rd, Nampa, Idaho; Frank N. Rawlings, Rt. 4, Boise, Idaho 83651

[22] Filed: Mar. 8, 1974

[21] Appl. No.: 449,503

[52] U.S. Cl. .................. 426/210, 426/69, 426/212, 426/364, 426/807
[51] Int. Cl. .......................... A23k 1/18, A23k 1/22
[58] Field of Search ............ 426/69, 364, 807, 212, 426/210; 260/123.5

[56] References Cited
UNITED STATES PATENTS

| | | | |
|---|---|---|---|
| 2,789,906 | 4/1957 | Zick | 426/69 |
| 3,020,158 | 2/1962 | Fetzer | 426/69 |
| 3,507,662 | 4/1970 | Leroy et al. | 426/212 |
| 3,619,200 | 11/1971 | Ferguson et al. | 426/69 |

FOREIGN PATENTS OR APPLICATIONS
549,339   11/1957   Canada.............................. 260/123.5

*Primary Examiner*—A. Louis Monacell
*Assistant Examiner*—Curtis C. Ribando
*Attorney, Agent, or Firm*—Richards, Harris & Medlock

[57] ABSTRACT

A novel feed supplement for ruminants, of whole decorticated, cracked, or comminuted oil seed naturally containing dispersed lipids within a proteinaceous material which has been reacted with an aldehyde after first being activated with ammonia to form an ammoniated protein-aldehyde complex is provided. A process for manufacturing the feed supplement is also provided wherein a whole decorticated, cracked or comminuted oil seed is initially ammoniated to activate the proteinaceous material and the ammoniated proteinaceous material is then reacted with an aldehyde.

19 Claims, 1 Drawing Figure

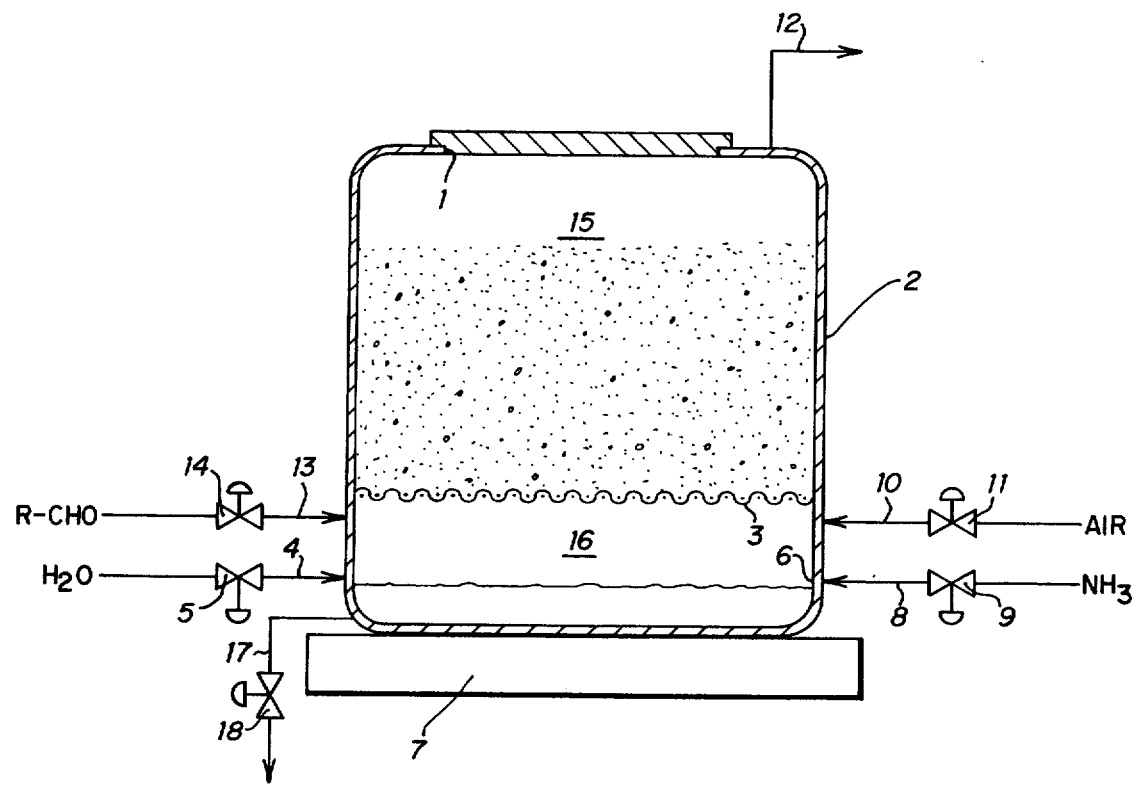

RUMINANT FEED SUPPLEMENT COMPRISING AN AMMONIATED PROTEIN-ALDEHYDE COMPLEX

BACKGROUND OF THE INVENTION

The milk, meat and meat by-products obtained from ruminants such as cows and sheep contain fat which is completely hydrogenated being known commonly as saturated fat. Such milk, meat and meat by-products constitute a large portion of the human diet. However, modern medicine has determined that assimilation of saturated fats by humans is detrimental to their health. Specifically, arterial and coronary diseases are believed directly associated with the level of saturated fat in the human diet. Ruminant milk, meat and meat by-products containing polyunsaturated fat would therefore be desirable.

Seeking to accomplish this end, ruminants have been fed high concentrations of unsaturated lipids but such attempts were unsuccessful. The animals became infirm, having severe gastric disturbances and a loss of appetite. Additionally, most all of the unsaturated lipids ingested by the animals were assimilated as saturated fat.

The ruminant animal has a multi-gastric system with a first stomach called a rumen where bacteria known generally as microflora are present. These bacteria have the ability to break down protein and hydrogenate unsaturated lipids. Therefore, a significant portion of the unsaturated lipids contained in ruminant feed are hydrogenated in the rumen by the microflora and assimilated by the animal as saturated fat. Additionally, the rumen apparently has a low tolerance to feeds containing high concentrations of saturated or unsaturated lipids. This low tolerance produces severe gastric process imbalance when feeds containing high concentrations of lipids are ingested. This imbalance causes the lipid material to be regurgiated or excreted in essentially its undigested form. Feeding high concentrations of lipids, therefore, resulted in a lower assimilation of lipid material than was achieved by feeding feeds containing lower concentrations of lipids.

Recently, a process has been developed to encapsulate lipids in a protective protein-aldehyde complex coating. This protein-aldehyde coating is not susceptible to breakdown in the rumen but is susceptible to breakdown in the abomasum and lower gut. This process includes finely dividing a lipid material into discrete particles or globules and forming an aqueous emulsion of the finely divided lipid and a proteinaceous material. The aqueous emulsion can then be reacted with an aldehyde such that the finely divided lipid particles are encapsulated in a protein-aldehyde complex. The emulsion can be spray dried or otherwise processed prior to the aldehyde addition or thereafter to form a coated particulate solid.

The disadvantages of such a process are cost and preparation time. Specifically, the lipid material must be finely ground prior to the formation of an aqueous emulsion. The emulsion must also be dried when, as in most cases, a solid feed is desired. Such a process involves expensive grinders, emulsification equipment and drying apparatus, in addition to energy required to dehydrate the emulsion.

SUMMARY OF THE INVENTION

According to the invention, a novel feed supplement for ruminants is provided of whole, decorticated, cracked or comminuted oil seed containing naturally dispersed lipids within a proteinaceous material which upon being reacted with an aldehyde after first having been activated with ammonia forms an ammoniated protein-aldehyde complex, which is substantially insoluble at pH levels greater than about 5 and substantially soluble at pH levels less than about 4. The feed supplement, upon ingestion by a ruminant, is thus not susceptible to breakdown in the rumen but is susceptible to breakdown in the abomasum and lower gut such that upon assimilation the polyunsaturated fat content of the milk and carcass is significantly increased.

The novel feed supplement of the subject invention is made by contacting a whole, decorticated, cracked or comminuted oil seed containing lipids naturally dispersed within proteinaceous material with ammonia in order to activate the proteinaceous material and subsequently reacting the ammoniated proteinaceous material with an aldehyde to form an ammoniated protein-aldehyde complex.

According to another embodiment of the invention, an apparatus to expedite and facilitate the practice of the above method is provided.

Any seed containing quantities of lipids and preferably unsaturated lipids and more preferably polyunsaturated lipids generally known as oil seeds, can be used in the scope of the instant invention. For example, oil seed such as sunflower, safflower, peanut, soybean, cotton, maize or rape and the like can be used. The seeds are preferably comminuted prior to ammoniation by being broken into at least two pieces in order to expose more proteinaceous material but preferably are ground to a particulate size of from about 1/32 to about 5/32 inch and more preferably about 3/32 inch. In addition, oil seed can be utilized after being cracked by any means known in the art. The whole oil seed may also be used but is preferably first decorticated. When the whole oil seed is used without prior decortication, the preferred seeds are soybean and rape seed.

The type of naturally dispersed polyunsaturated lipid material contained in the oil seed utilized will depend upon the variety of seed. However, linoleic acid and linolenic acid are known prevalent in almost all whole oil seeds. These acids, along with arachieonic acid, comprise the so-called essential fatty acids. The essential fatty acids are known to be required in the metabolism and degradation of cholesterol in the human body. Linoleic acid is straight chain molecule having the formula $C_{17}H_{31}COOH$ with double bonds between carbon atoms 9 and 10, and 12 and 13. Linolenic acid is a straight chain molecule having the formula $C_{17}H_{29}COOH$ with double bonds between carbons 9 and 10, 12 and 13, and 15 and 16. Additionally, oil seeds may contain monounsaturated, saturated, and other polyunsaturated lipids naturally dispersed within the proteinaceous material. These lipids are likewise protected by the ammoniated protein-aldehyde complex from degradation in the rumen.

The oil seed utilized in practicing the subject invention may be chosen according to the percentage of one or more of the lipids naturally present therein. A mixture of such seeds may also be utilized.

Oil seeds contain natural moisture in amounts from about 5 to about 30 percent by weight. A weight percent of moisture within the above range is desirable. Preferably, the seeds prior to ammoniation are brought into intimate contact with a moist atmosphere for example, about 90 percent humidity and preferably a saturated atmosphere to add additional moisture to the seeds. Such additional moisture is particularly preferred when whole oil seeds are to be used or seeds are to be used containing less than about 9 percent by weight natural moisture or seeds originally containing more than 9 percent by weight natural moisture are caused to lose such moisture by, for example, comminuting.

Ammoniation is prefarably accomplished with anhydrous ammonia in amounts from about ¼ to 2 lbs. of anhydrous ammonia per 40 lbs. of the oil seed and preferably about 1 lb. of anhydrous ammonia to about 40 lbs. of the oil seed. Ammoniation is preferably accomplished at elevated temperatures from about ambient to about 175°F. with 150°F being preferred. At such elevated temperatures, ammoniation can be substantially accomplished in relatively short periods of time, for example, about 1 hour.

The reaction of the ammoniated proteinaceous material with the aldehyde to form an ammoniated protein-aldehyde complex is accomplished at temperatures from about ambient to about 175°F. with about 150°F. being preferred. At such elevated temperatures, it has been found that the ammoniated protein will be substantially reacted with the aldehyde in from about 0.5 hours to about 1.5 hours.

The aldehyde utilized in forming the protein-aldehyde complex can be any hydrocarbon containing at least one aldehyde group thereon, as long as remaining groups do not interfere with the reaction between the CHO and $NH_2$ of the protein. Further, the aldehyde may be liquid, solid or gaseous in form. Based upon availability, a preferred group of aldehydes is formaldehyde. gluteraldehyde, glyoxal and the like. The most preferred aldehyde is formaldehyde.

The amount of aldehyde utilized in accordance with the present invention depends upon the amount of protein initially present in the whole oil seed. Seeds contain about 10 to 40 percent by weight protein. Generally, sufficient aldehyde must contact the ammoniated proteinaceous material such that the ammoniated protein-aldehyde complex formed is substantially insoluble at pH levels greater than about 5 and substantially soluble at pH levels less than about 4. The solubility characteristics are required to insure that the ammoniated protein-aldehyde complex is resistant to degradation in the rumen but susceptible to such degradation in the abomasum. About 1 to 6 percent by weight and preferably about 1 to 3 percent by weight and more preferably about 2 percent by weight of an aldehyde per total weight of protein in the whole oil seed is generally sufficient.

If necessary, particularly when larger amounts of whole, comminuted, cracked and/or decorticated whole oil seed is being processed, the solid reactants may be continually agitated throughout the entirety of the process to enhance the reaction by continually exposing unreacted surfaces. Means for effectuating agitation such as rotating drum, mechanical shakers, stirring devices and fluidized beds will be apparent to those skilled in the art.

BRIEF DESCRIPTION OF THE DRAWING

The drawing is a schematic representation of one embodiment of the invention.

DESCRIPTION OF THE PREFERRED EMBODIMENT

Referring now to the drawing, comminuted or decorticated or cracked oil seed is added through a sealable opening 1 at the top of vessel 2 which has a lower closed end. The seed comes to rest upon a gas permeable member 3 which is supported in vessel 2 to form an upper chamber 15 and adjacent to the lower closed end of the vessel a lower manifold chamber 16.

Next, water is passed via conduit 4 through valve means 5 into vessel 2 until the water level extends to a point immediately below inlet 6. A heater 7 which may be of any type known in the art, e.g., electric, gas, steam and the like having an operating temperature range from about 50°F to about 200°F, is then energized. The temperature is regulated such that a moist atmosphere is formed within vessel 2, e.g., preferably at least 90 percent humidity, and more preferably a saturated atmosphere. The moist atmosphere is maintained within vessel 2 for a sufficient period to impart the desired amount of moisture to the seed material, e.g., from about ½ to about 1 hour.

Next, valve 18 is opened and the water in lower manifold chamber 16 is caused to drain from vessel via conduit 17 to a sewage drain (not shown). A continuous flow of anhydrous ammonia is then passed into vessel 2 from an ammonia source (not shown) via conduit 8 and valve 9. Simultaneously, air is passed into vessel 2 via conduit 10 and valve 11 from a compressed air source (not shown) at sufficient pressure to maintain a flow through the entire seed bed. The anhydrous ammonia and air are admixed in lower manifold chamber 16, pass upwardly through permeable member 3, coming in intimate contact with the material in the seed bed, thus activating the proteinaceous material and finally exit vessel 2 by means of conduit 12. The exit vapors can, if desired, be recycled through the system by suitable conduit means (not shown).

Ammoniation is allowed to proceed for a period of at least 1 hour and then the anhydrous ammonia is shut off by means of valve 9. Then water is passed via conduit 4 and valve 5 into vessel 2 in sufficient quantity to completely dissolve a solid aldehyde such as paraformaldehyde which is then added to the water in the lower portion of vessel 2 via conduit 13 through valve 14. Heater 7 is then regulated to maintain a temperature from about 100°F to about 175°F and preferably about 150°F. The air flow is maintained at sufficient pressure to provide flow through the entire seed bed. The vaporous aldehyde admixed with air and water in manifold chamber 16 passes upward through gas permeable member 3, through the seed bed and exits through conduit 12. The exit vapor can, if desired, be recycled through the system by suitable conduit means (not shown). As the aldehyde is caused to pass through the seed bed, it comes in intimate contact with the ammoniated proteinaceous material reacting therewith and forming an ammoniated protein-aldehyde complex having naturally dispersed lipids therein. The reaction is allowed to continue for about one hour.

Instead of using a solid aldehyde, such as paraformaldehyde, and forming an aqueous solution which is subsequently vaporized, a gaseous aldehyde, such as formaldehyde, may be used. In utilizing gaseous formaldehyde, the water need not be present in lower manifold chamber 16. The formaldehyde is passed into vessel 2 via conduit 13 and valve 14 from a formaldehyde source (not shown) after the termination of the ammoniation step. Heater 7 is regulated to maintain a temperature from about 100°F. to about 175°F. and preferably about 150°F., and the reaction proceeds as previously described.

The following theory of the ammoniation step is advanced for clarity, and is not to be construed as a limitation. It is believed that the anhydrous ammonia initially enters such as by diffusing through the seed hull and reacts with the protein to solubilize the proteinaceous material. It is known that the ammonia molecule is hydrophilic and therefore it is believed that the ammonia molecule goes directly to the membrane protein containing a small lipid globule therein. As used herein, membrane protein refers to the proteinaceous material surrounding the lipid globule. The proteinaceous material thus solubilized is believed to react more readily with the formaldehyde. The exact solubilization mechanism is unclear, but it is possible that the ammonia severs the peptide linkage and/or adds $NH_2$ to the protein molecule which in turn will react with the formaldehyde.

This invention can be more easily understood from the study of the following example which is given for illustrative purposes only.

EXAMPLE

In this example, a feed supplement containing naturally dispersed polyunsaturated lipids within an ammoniated protein-aldehyde complex was produced utilizing the technique and apparatus described above. The oil seed utilized was comminuted decorticated sunflower seed having an average particle size of 3/32 inch. After the addition of water into the vessel, the heater was energized to maintain the temperature at about 150°F. The moist atmosphere produced was allowed to contact the oil seed for about ½ hour. The water was drained and anhydrous ammonia was supplied at the rate of about 1 lb. of anhydrous ammonia to 40 lbs. of comminuted seed. Air pressure was supplied at about 30 psi. the anhydrous ammonia was allowed to react with the comminuted seed for about one hour and then shut off. Next, water was readded to the vessel and paraformaldehyde was added to the heated water producing an aqueous formaldehyde solution which vaporized under the existing conditions. Sufficient paraformaldehyde was added to provide about 2 percent by weight of formaldehyde vapors based upon the total protein in the comminuted seed. Compressed air was supplied at about 30 psi. The aldehyde was reacted with the ammoniated seed for about one hour and then shut off. The reacted comminuted seed was then purged of aldehyde with compressed air.

Samples of the reacted comminuted seed and samples of unreacted comminuted seed, used as a control group, were then separately incubated anaerobically at 38°C. with strained rumen fluid obtained from a sheep which had been fasted for at least twelve hours. The degree of hydrogenation was determined by comparing the percentage by weight of linoleic acid present in the respective mixtures before and after incubation. The results of the particular test are set out in Table 1.

TABLE 1

LINOLEIC ACID

| | Content by Weight Percent | |
|---|---|---|
| | Prior to Incubation | After Incubation |
| CONTROL | 54.8 | 9.7 |
| REACTED | 57.8 | 41.2 |

As can be seen in Table 1, the reacted seed contained 57.8 percent by weight of linoleic acid prior to incubation with the rumen juice and 41.2 percent by weight linoleic acid after such incubation, showing a resistance to degradation in the rumen juice of about 70 percent. The unreacted comminuted seed (control) on the other hand, showed at 54.8 percent by weight linoleic acid content prior to exposure to the rumen juice and only a 9.7 percent by weight of linoleic acid content after such exposure. The unreacted comminuted seed showed a resistance to degradation in the rumen juice of only 18 percent.

The above in vitro test clearly indicates that the comminuted seed which was not treated in accordance with the invention underwent significantly more hydrogenation in the rumen juice than did the same comminuted seed treated in accordance with the instant invention.

While this invention has been explained in relation to its preferred embodiment, it is to be understood that various modifications thereof will now become apparent to those skilled in the art upon reading the specification, and it is intended to cover such modifications as fall within the scope of the appended claims.

What is claimed is:

1. A feed supplement for ruminanats consisting essentially of:
   an oil seed material containing naturally dispersed unsaturated lipids within a proteinaceous material which has been reacted with an aldehyde selected from the group of hydrocarbons containing at least one aldehyde group which is available for reaction with said proteinaceous material, after said proteinaceous material has been activated with ammonia by contact with said ammonia to form an ammoniated protein-aldehyde complex which is substantially insoluble at pH levels greater than about 5 and substantially soluble at pH levels less than about 4.

2. A feed supplement as recited in claim 1 wherein said oil seed material contains polyunsaturated lipids.

3. A feed supplement as recited in claim 1 wherein said oil seed material is a whole oil seed.

4. A feed supplement as recited in claim 1 wherein said oil seed material is decorticated oil seed.

5. A feed supplement as recited in claim 1 wherein said oil seed material is cracked oil seed.

6. A feed supplement as recited in claim 1 wherein said oil seed material is comminuted oil seed.

7. A method for manufacturing a feed supplement for ruminants containing naturally dispersed unsaturated lipids within a protein-aldehyde complex which is substantially insoluble at pH levels greater than about 5 and substantially soluble at pH levels less than about 4, comprising the steps of:

a. contacting a material selected from whole oil seed, decorticated oil seed, cracked oil seed and comminuted oil seed, containing naturally dispersed unsaturated lipids within a proteinaceous material with ammonia to activate said proteinaceous material; and b. reacting said activated proteinaceous material with an aldehyde selected from the groups of hydrocarbons containing at least one aldehyde group which is available for reaction with said proteinaceous material.

8. A process as recited in claim 7 wherein said proteinaceous material contains naturally dispersed polyunsaturated lipids.

9. A process as recited in claim 8 wherein said whole oil seed is selected from a group consisting of soybean, peanut, sunflower, safflower, cotton, maize and rape.

10. A process as recited in claim 9 wherein said contacting step is accomplished at temperatures from about ambient to about 175°F.

11.. A process as recited in claim 10 wherein said contacting step is accomplished at a temperature of about 150°F.

12. A process as recited in claim 11 wherein said reacting is accomplished at temperatures of about ambient to about 175°F.

13. A process as recited in claim 12 wherein said reacting is accomplished at a temperature of about 150°F.

14. A process as recited in claim 13 wherein said aldehyde is selected from a group consisting of formaldehyde, gluteraldehyde and glyoxal.

15. A process as recited in claim 14 wherein said aldehyde is formaldehyde.

16. A process as recited in claim 15 wherein from about 1 to about 6 percent by weight of said formaldehyde based upon the weight of protein in said oil seed material is reacted with said activated proteinaceous material.

17. A process as recited in claim 16 wherein said ammonia is anhydrous ammonia.

18. A process as recited in claim 17 wherein from about ¼ to about 2 pounds anhydrous ammonia per about 40 pounds of said oil seed material is contacted with said oil seed material.

19. A process as recited in claim 18 wherein about 2.5 percent by weight anhydrous ammonia based upon the weight of said oil seed material is contacted with said material.

* * * * *